This invention relates to conveyor apparatus, and more particularly to dual track conveyors for conveying and temporarily storing articles having paired load support surfaces.

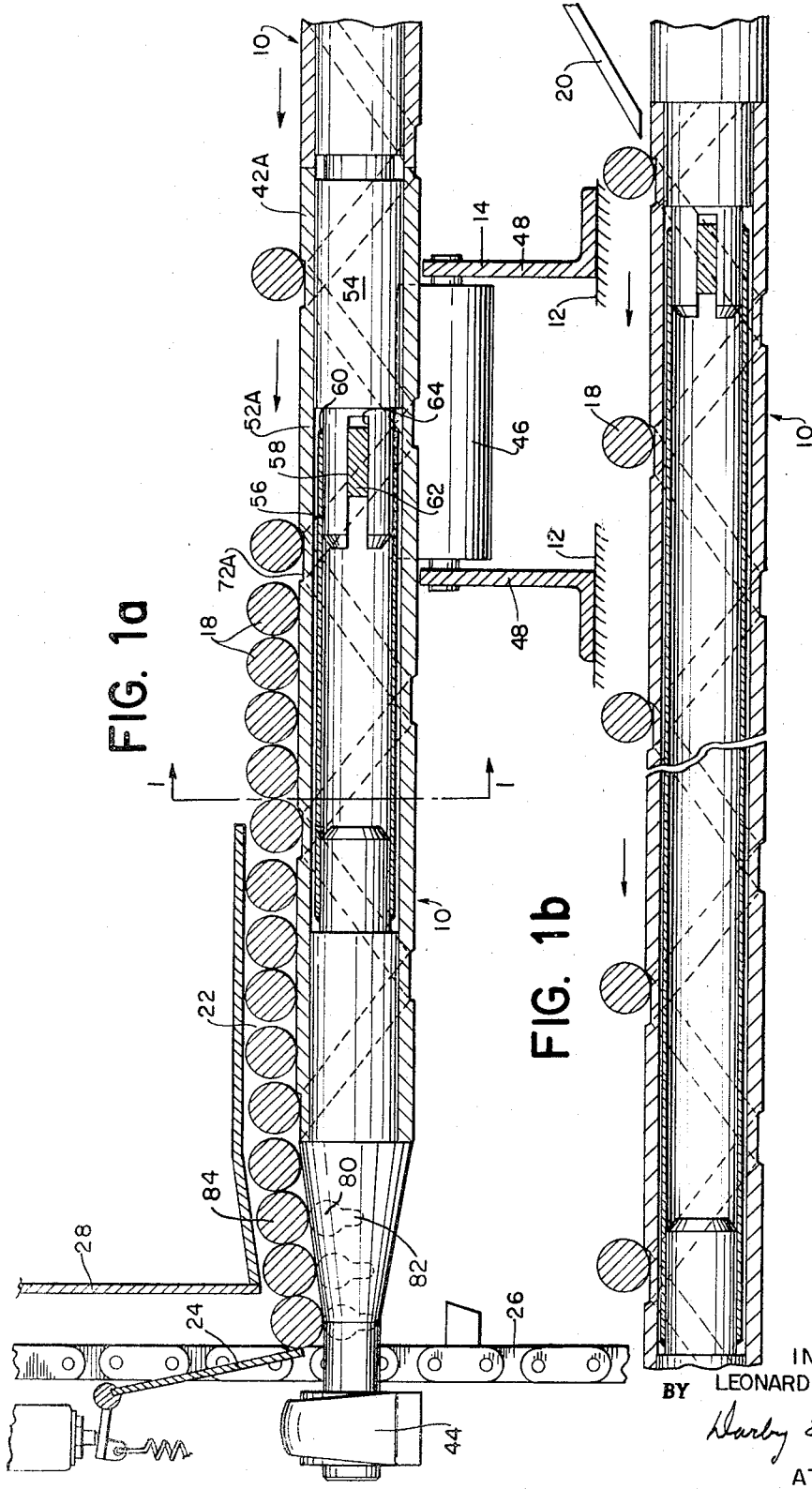

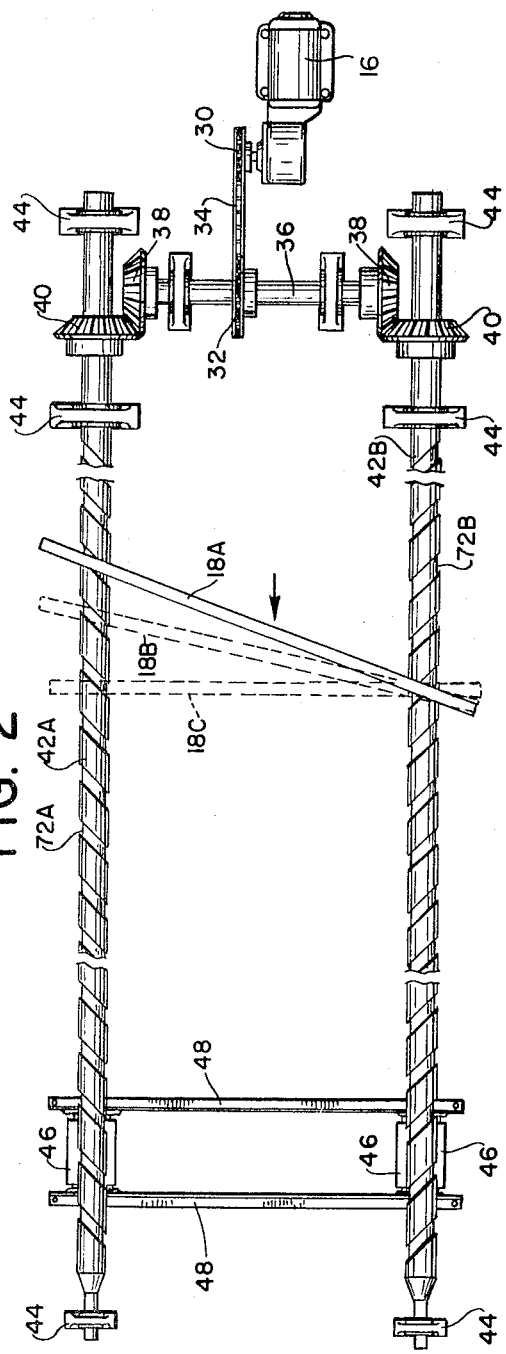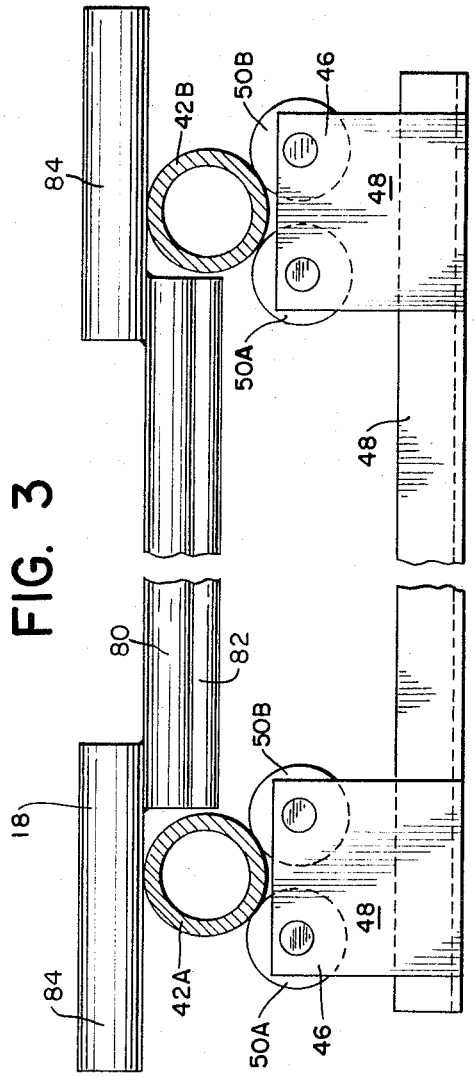
INVENTOR.
LEONARD DeFRANCISCI
ATTORNEYS 3,308,930
CONVEYOR APPARATUS
Leonard De Francisci, Lido Beach, N.Y., assignor to De Francisci Machine Corporation, a corporation of New York
Filed Dec. 29, 1964, Ser. No. 422,084
8 Claims. (Cl. 198—213)

This invention is particularly well suited for use in association with macaroni dried equipment. It should be understood, however, that it is suitable for many other applications where articles having paired load support surfaces are conveyed, e.g. conveying of cans, bar stock, welding rods, etc. For clarity of description of the invention this specification will concentrate principally on its use in association with macaroni dried equipment.

Conventionally in such equipment a macaroni spreader extrudes macaroni onto a succession of rods which advance in synchronism with the spreader operation. These macaroni laden rods are then conveyed (usually by a dual track chain conveyor) through successsive stages of a drier. After the drying operation is completed, the dried macaroni is conveyor on the rods to a stripper which strips the macaroni from the rods, diverting the stripped macaroni to packaging stations and discharging the empty rods to a rod return conveyor. The rod return conveyor delivers the empty rods to a magazine adjacent to the spreader where the empty rods accumulate on top of the return conveyor until they are picked up and conveyed to the spreader for repetitive trips through the drying and stripping cycle. Thus the rod return conveyor performs two functions, that of returning the empty rods to a location adjacent the spreader and that of storing the rods at that location.

This storing capability is especially important in modern continuous macaroni drier lines where the spreader and drier run continuously twenty-four hours a day, while the stripper operates only during the eight hour day shift. Dried macaroni produced during the previous right and early morning shifts is stored in an accumulator while the stripper is shut down. The accumulator empties its full day's storage of dried macaroni by feeding it to the stripper during the eight hour day shift.

Thus while empty rods feed to the spreader at a steady rate throughout the full twenty-four hour day, the empty rods must discharge from the stripper at a much higher rate during the eight hour day shift. During this day shift the stripper discharges three rods for every one rod supplied to the spreader. No rods are discharged from the stripper during the night and early morning shifts. The unused rods furnished during the day are stored in a magazine on the rod return conveyor, and this magazine provides the spreader with a ready supply of rods for the full twenty-four-hour period.

In operating these modern continuous driers in this way, conventional rod return conveyors are beset by two distinct problems. The first is misalignment of the rods on the conveyor, and the second is rod jamming and pressure build-up in the rod storage magazine.

Misalignment may result from obstructions in the path of the rods on the conveyor or from slippage of the rods on the conveyor. It may also occur when the empty rods discharged from the stripper fall onto the return conveyor unevenly, i.e. one side of the rod drops onto the conveyor before the other. A certain degree of misalignment is acceptable, since ultimately the rods will be straightened out at the end of their run by coming to rest against other rods in the rod storage magazine. When misalignment exceeds a certain limit, however, one end of the rod slips off its supporting track, and this causes the entire rod to fall onto the floor beneath the conveyor.

The second problem encountered with conventional rod return conveyors is the tendency of the rods to jam and build up high pressures in the rod return magazine. In conventional rod return systems in use prior to this invention, a dual track chain conveyor feeds the rods to a magazine which usually comprises a pair of retractable stops for each rod end at the end of the rod return run and a corresponding pair of guide rails spaced above the conveyor to prevent stopped rods from jumping or bridging over the next adjacent rod. These guide rails are spaced sufficiently far above the conveyor to permit the stopped rods to slide loosely on top of the moving conveyor which continues to advance beneath them, the rods simply sliding on top of the conveyor.

Since the conveyor continues to advance under the stopped rods, it exerts frictional pressure against the rods, tending to jam them together. The amount of this frictional pressure is directly proportional to the number of stopped rods held in storage. As the number of stopped rods increases beyond a certain limit, the frictional forces jam the rods tightly against the stops and between the conveyor and the guide rails. This jamming further aggravates the problem and ultimately creates prohibitively high loads which seriously damage the stick ends and the conveyor and which also increase the power requirements, and hence the costs, for running the conveyor.

Thus, these two problems of rod misalignment on the rod return conveyor and rod jamming in the rod storage magazine are serious drawbacks in continuous macaroni driers currently in use. The trend toward higher capacity-longer conveyor runs in modern continuous macaroni driers has made these problems even more serious, since longer conveyors and the larger number of rods being handled both tend to increase the prevelance of these problems.

The invention disclosed herein practically eliminates these problems. Briefly summarizing it, a dual track, helically threaded conveyor is used to return the empty rods to the rod storage magazine. Associated with this conveyor are means for preventing the rods from sliding laterally off the conveyor. A novel mounting arrangement for the conveyor assures accurate alignment and positioning with minimal loss of power output efficiency. While this disclosure will relate principally to macaroni rod conveyors, it must be emphasized again that my invention is not limited to uses relating to macaroni drier rods, but may find application wherever cylindrically shaped or other articles having two spaced load support surfaces are conveyed.

It is, therefore, a principal object of my invention to provide a method and means for conveying articles on a dual track conveyor which corrects against misalignment of the articles of the conveyor.

It is another object of my invention to provide a method and means for conveying articles on a dual track conveyor which carries the articles to a stop mechanism and which permits the conveyor to run beneath the stopped articles without creating a build-up of pressure against the stopped articles.

Other objects of this invention not at this time more particularly enumerated will be apparent from the accompanying description and drawings, wherein FIGURE 1 (*a* and *b*) is an elevation view in partial section of a macaroni drier rod return conveyor made in accordance with this invention;

FIGURE 2 is a plan view of the conveyor illustrated in FIGURE 1 (*a* and *b*); and FIGURE 3 is a cross-sectional view of a conveyor illustrated in FIGURE 1 (a and b), the cross-section being located by section lines 1—1 in FIGURE 1 (a and b).

As pointed out above, while this invention has applications in a variety of uses, the particular embodiment to be described in this specification is a rod return conveyor intended for use in association with macaroni drier equipment.

Referring to FIGURE 1 (a and b), the principal components of the illustrated macaroni rod return system are the conveyor 10 which is supported from the floor 12 on bearings 14. Conveyor 10 is driven by motor 16 (FIGURE 2). Empty rods 18, which are to be carried by conveyor 10, are received from a conventional macaroni stripper (not shown), being gravity fed from chute 20. Conveyor 10 carries rods 18 in the direction indicated by the arrows to the rod storage magazine 22, where rods 18 are halted by stops 24. Here the rods 18 are stored until picked up by chain 26, which conveys them upwardly to a conventional macaroni spreader (not shown). As pointed out above, the spreader extrudes and drapes a curtain of macaroni strands over rods 18, which then pass through the drier (not shown) and exit from chute 20 after the dried macaroni has been stripped from rods 18 by the stripper.

To assure smooth flow of rods 18 in and through storage magazine 22 and on chain 26, guide rails 28 are provided. These rails keep rods 18 in line and prevent them from bridging over one another and jamming.

Referring to FIGURE 2, motor 16 may be a conventional electrical motor which powers sprocket 30 to drive sprocket 32 through chain 34. Sprocket 32 is mounted centrally about shaft 36 which carries bevel gears 38 at each end to drive bevel gears 40. Bevel gears 40 are mounted on and drive helically threaded tubes, hereinafter referred to as screws 42A and 42B, of conveyor 10 in opposite directions as indicated by the arrows. Screws 42A, 42B are rotatably mounted at their extremities by journal bearings 44 and along their run by pillow bearings 46, all of which are supported from the floor 12 by suitable framework 48.

Referring to FIGURES 2 and 3, pillow bearing 46 comprises cylindrical rollers 50A and 50B which are mounted free to rotate in framework 48. Screws 42A and 42B are properly positioned and aligned by resting in line contact against both rollers 50A and 50B, as illustrated in FIG. 3.

FIGURE 1 (a and b) shows the constructional details of the feed screws 42A and 42B. The outer threaded sleeve 52A and 52B of screws 42A and 42B, respectively, are preferably made of wear resistant, relatively rigid P.V.C. (poly vinyl chloride) plastic. Sleeves 52A and 52B are supported by being snugly fitted around and glued with epoxy glue to mandrels 54 and by being loosely fitted around tubing 56, both mandrels 54 and tubing 56 are preferably made of steel.

Adjacent sections of tubing 56 may be joined together by mandrels 54 by means of a key joint 58 and weldment 60. Key joint 58 is made by providing tubing 56 with key 62 which is welded to one inside end of tubing 56. To mate with the key 62, mandrel 54 is provided with a keyway 64.

Operation of conveyor 10 is best illustrated in FIGURE 2 where a single rod 18 is shown in progressive stages of alignment on conveyor screws 42A and 42B. As illustrated, rod 18 is conveyed from right to left, being shown in solid lines at position A in its most misaligned position. As pointed out above, this misalignment might be caused by an obstruction in the path of rod 18 which momentarily retards the lagging end of rod 18 and cocks it in the misaligned position shown. Because of the thread type engagement of the load bearing surfaces of rod 18 with screws 42A and 42B (see FIGURE 1), when rod 18 becomes as badly aligned as shown at position A, only one end of rod 18 is driven by conveyor 10. The end of rod 18 driven by screw thread 72A receives almost full push of screw thread 72A because rod 18 is fully engaged with it, whereas the opposite end of rod 18 driven by screw thread 72B is not pushed at all because that end bridges across and is thus completely disengaged from thread 72B.

As a result, rod 18 advances to position B (dashed line) at which point both ends resume advance (provided the obstruction is removed), although at unequal speed because of unequal engagement with threads 72A and 72B. At position C, rod 18 (dashed lines) has approached substantial alignment to the point where both of its ends are moving at substantially equal speed.

Another important advantage of this conveyor is illustrated in FIGURE 1 (a and b). As pointed out above rods 18 are stored in magazine 22 bounded by guide rails 28 at the top, stops 24 at the exit end and conveyor screws 42A and 42B at the bottom. As pointed out above, in conventional rod return systems, rods tend to jam in this magazine, because the rod return conveyor continues to try to advance each of the rods held in the magazine and thereby crowds them tightly in the magazine. This jamming tendency is cumulative with the advance and halting of each rod. Also, in addition to the jamming problem, very high loads are built up in the conventional magazines because of this overloading tendency. These high loads not only increase power consumption but also seriously damage the conveyor and the macaroni rods.

Reference to FIGURE 1 (a and b) shows how these problems have been remedied by the conveyor disclosed herein. Threads 72A and 72B of screws 42A and 42B provide the pushing force for rods 18. But when a number of rods 18 are held in magazine 22, threads 72A and 72B engage only one out of approximately every five rods 18, the other four not being driven at all, but resting freely on top of screws 42A and 42B. Furthermore, as threads 72A and 72B advance, they set up a wave-like jiggling action in rods 18 held in magazine 22, which keeps them loose and thereby eliminates the tendency to jam or bridge over one another. There are a variety of thread lead and rod size relationships which could be selected to provide this anti-jamming action.

It should be noted in this respect that the horizontal sections of guide rails 28 may be eliminated in this conveyor, because this bridging tendency has been eliminated by reason of the above described operation. These portions of rails 28 are included in the drawing to illustrate how this conveyor can be adapted to existing drier rod return systems.

With respect to a specific design found suitable for macaroni drier rod return conveyor use, threads 72A and 72B may be cut ¾ inch wide and .045 inch deep with a 4½ inch pitch on 1.1650 inches diameter sleeves 52A and 52B. Rods 18 to be used with these sleeves 52A and 52B are preferably of the type having a central macaroni carrying bar 80 with an integral lower rib 82, both being suspended on conveyor 10 by a pair of larger cylindrical lugs 84 on each end. (FIGURES 1a and 3). This construction lowers the center gravity of rod 18, thereby improving stability. It also prevents dumping of rods 18, because bar 80 and rib 82 track the rod 18 between screws 42A and 42B. In the illustrative macaroni drier conveyor of the above specified dimensions, lugs 84 are preferably ⅞ inch in diameter in order to provide suitable engagement with threads 72A and 72B.

Recent experiments indicate that the dimensional relationship between the diameter of lugs 84 and the width of threads 72A and 72B can vary over a substantial range. There are indications that the optimum relation is when the thread width is approximately one-half the lug diameter. Furthermore, it has been found that the cross-sectional shape of threads 72A and 72B need not be rectangular but may be trapezoidal, curved, triangular or otherwise, provided positive engagement with lugs 84 can be obtained. With respect to lugs 84, it has been found that they need not be circular. Experiments have established the practicality of using generally square lugs 84 for the purpose of distributing the load over a wider area and thereby reducing wear both on lugs 84 and on screws 42A and 42B.

Thus while this description has been directed principally to macaroni drying and more specifically to a particular structural embodiment of the disclosed invention, it must be understood that this invention is not limited to macaroni drier uses or to the specific embodiment described herein. The invention may find application wherever cylindrical articles or articles having pairs of spaced support surfaces are conveyed. It is also apparent that modifications of the disclosed structure will undoubtedly be obvious to those skilled in the art, such as the use of different thread shapes, varying thread leads between the screws, different materials and different assembly techniques, but these modifications are comprehended by this invention so long as the basic conveyor arrangement is employed. Therefore, while this description has concentrated on certain preferred uses and embodiments of the invention, it is to be understood that the invention is not to be limited by the foregoing description but solely by the claims granted herein.

What is claimed is:

1. Apparatus for conveying and storing macaroni rack rods comprising in combination:
   (a) two threaded conveyor screws positioned on parallel axes and spaced to engage said rods adjacent their opposite ends when aligned transversely on said screws,
   (b) means for rotating the threads of said screws oppositely to each other and outwardly from each other about their upper rod supporting surfaces, whereby said rods when placed on said screws are conveyed thereby to a rod discharge station, and
   (c) stop means adjacent said rod discharge station for stopping the lead rod of a plurality of rods on said screws, said threads having a pitch other than equal to the cross-sectional width of said rods where such rods engage said screws when aligned transversely thereon, said width being taken parallel to said screw axes, whereby said screws rotate relatively free of load build-up from rods stopped by said stop means, and whereby said rods do not jam against each other when stopped by said stop means.

2. Apparatus as claimed in claim 1 wherein the pitch of said threads is greater than said cross-sectional width of said rods.

3. Apparatus as claimed in claim 2 wherein the pitch is greater than a low whole number multiple of said width.

4. Apparatus as claimed in claim 2 wherein the pitch, depth and width of said threads are dimensioned relative to each other and relative to said rod width such that the threads push against only a small cross-sectional segment of each such rod when such rod is engaged transversely by said threads, whereby the threads of both of said screws push equally the opposite ends of said rod when thus transversely engaged, and whereby the threads of only one of said screws push one end of a rod when such rod lies diagonally on said screws and the other end of said rod bridges across adjacent threads on the other screw and slips successively to the next adjacent threads of said screw until engaged by one of such threads.

5. Apparatus as claimed in claim 4 further comprising means for guiding said rods on said screws to maintain engagement of said rods with the upper revolving support surfaces of said screws.

6. Apparatus as claimed in claim 5 wherein said guiding means comprise offsets on said rods adjacent the opposite ends of said rods and adjacent each said screw when said rods are aligned transversely on said screws, said offsets limiting the transverse movement of said rods by contacting the sides of said screws to maintain said engagement.

7. Apparatus as claimed in claim 4 wherein the pitch of the threads is between two (2) and eight (8) times said width of said rods.

8. Apparatus as claimed in claim 4 wherein said rod is circular in cross-section where such rod engages said screws, and wherein the pitch, depth and width of said threads are so dimensioned that the depth of the segment of rod engaged by the threads is less than one-fourth (¼) the radius of said cross-section.

References Cited by the Examiner
UNITED STATES PATENTS

| | | | |
|---|---|---|---|
| 723,392 | 3/1903 | Junbecker | 198—213 X |
| 1,565,849 | 12/1925 | Durand | 198—213 X |
| 2,657,722 | 11/1953 | Hillbom | 198—213 X |
| 2,882,546 | 4/1959 | Andrews et al. | 198—213 X |
| 3,196,772 | 7/1965 | Sickles | 198—213 X |

EVON C. BLUNK, *Primary Examiner.*

SAMUEL F. COLEMAN, *Examiner.*

R. J. HICKEY, *Assistant Examiner.*